March 25, 1941.    C. A. CAMPBELL    2,235,917

AIR BRAKE

Filed Oct. 23, 1939    2 Sheets-Sheet 2

Fig. 2
Fig. 3
Fig. 4
Fig. 5

Inventor
Charles A. Campbell

Attorneys

Patented Mar. 25, 1941

2,235,917

UNITED STATES PATENT OFFICE 2,235,917

AIR BRAKE

Charles A. Campbell, Watertown, N. Y., assignor to The New York Air Brake Company, a corporation of New Jersey Application October 23, 1939, Serial No. 300,824

11 Claims. (Cl. 303—21)

This invention relates to air brakes and particularly to a mechanism which, as an incident to the commencement of a brake application, determines whether a definite limit is or is not to be imposed on the intensity of the commencing application.

This determination is based on whether or not train speed at that time is below or above a definite value. The purpose is to prevent the initiation of unduly intense brake applications at low train speeds because such application would then produce wheel sliding.

In a prior application, Serial No. 250,665, filed January 12, 1939, issued after the filing of the present application as Patent 2,198,760, April 30, 1940, I disclose and claim such a device in combination with a deceleration controller, that combination having certain novel functions and advantages. The present application is drawn to the device for limiting pressure in response to speed, irrespective of deceleration control, and includes certain improvements not disclosed in the prior application, in addition to the basic mechanism which is there disclosed but not there claimed.

The specific devices described in the present application can be used in the combination claimed in the prior application.

In that application, a high speed deceleration controlled system of the combined straight-air automatic type is illustrated. In such a system, the engineer's brake valve operates to develop pressure in a control chamber and the pressure in the control chamber operates through relays to establish corresponding pressures in the brake cylinders throughout the train. The deceleration controller in such a system modulates the control chamber pressure to maintain a uniform deceleration rate substantially throughout the stop. To do so, it terminates, in response to the initial deceleration, the development of pressure in the control chamber, and thereafter reduces that pressure at a rate or rates such as to maintain the deceleration substantially constant.

According to the application above-identified, there is imposed on the system a secondary and wholly independent control in response to speed. This control is put into action by the initial development of pressure in the control chamber and its ultimate function is to limit in terms of train speed at the commencement of the application the maximum pressure which can be developed in the control chamber, independently of and prior to response of the deceleration controller.

The limitation of control chamber pressure in terms of train speed is determined by the energization or de-energization of an electro-magnetic valve. Above a chosen speed, this valve is energized and inhibits limitation; below this speed, it is momentarily energized and immediately de-energized, the momentary energization occurring at a time when the control chamber pressure is so low that the pressure limiting valve is functionally ineffective, so that momentary suspension of the limiting function is immaterial.

According to the prior application, the initial rise of pressure in the control chamber closes two contactors, which are connected to move in unison, and then releases them. One contactor closes and thus energizes a circuit through the magnet valve. The other closes and energizes a circuit through a sticker coil and a circuit interrupter which is driven in proportion to train speeds. Above a chosen speed, the sticker coil holds the contacts closed. Below the chosen speed, the contactors are not held closed by the sticker coil but immediately drop open.

In the prior device, the effect is such as to limit the development of control chamber pressure when train speed is below the chosen value, so that when the deceleration controller becomes effective in response to the resulting brake application, the application will not be so intense as to cause over-activity of the deceleration controller.

It should be observed that when the deceleration controller comes into action, it functions to terminate increase of control chamber pressure. Hence, the speed responsive device must exercise its limiting functions prior to and independently of the response of the deceleration controller. During the stop, reduction of speed causes de-energization of the electro-magnetic valve.

In the prior device, just before the brakes are completely released, the pressure responsive device, in moving back to normal position, momentarily recloses the circuits above-mentioned. While this is functionally unobjectionable, it involves unnecessary wear on the parts and unnecessary damage to the contactors caused by arcing.

One important object of the present invention is to produce a device in which the circuits are closed on rise of pressure at the commencement of an application but are not closed on falling pressure toward the end of the application.

Several embodiments are shown. According to the preferred embodiment, rising pressure momentarily closes a circuit through a pick-up coil which, through electro-magnetic action, picks up contactors for the sticker circuit and for the magnet valve circuit. If the train speed at such time is above the chosen value, the contactors remain up until the application reduces train speed below that value. Otherwise, they immediately drop open.

In a modified construction, a pressure motor which closes the contactors on rising pressure, and then releases them, is so contrived as not to close them on falling pressure.

In the present application, it is unnecessary to illustrate the complete system, because the novelty resides in means for limiting pressure build-up in relation to speed. The device is of general applicability. It could, and commonly would be, used to limit the build-up of pressure in the control chamber of a system, including a decelerometer which cuts the control chamber off from the source of supply and thereafter modulates pressure in the control chamber.

In the present drawings, for descriptive purposes, a simple brake cylinder is used to typify any means for applying brakes in response to pressure. Other known means are relays, and control chambers, either with or without decelerometers, for example.

In the drawings:

Figure 2 shows a similar organization making use of a rotary relay switch in which the moving parts are so balanced as to be less subject to derangement by vibration and shock.

Figure 3 is a sectional plan of the relay on the line 3—3 of Figure 2, the parts being shown in circuit closing position.

Figure 4 is a similar view in circuit breaking position.

Figure 5 is a sectional plan on the line 5—5 of Figure 2.

Figure 6 is a simplified diagram showing a relay switch of the type described in my prior application but modified to prevent circuit closure during the last stages of release.

Figure 1:
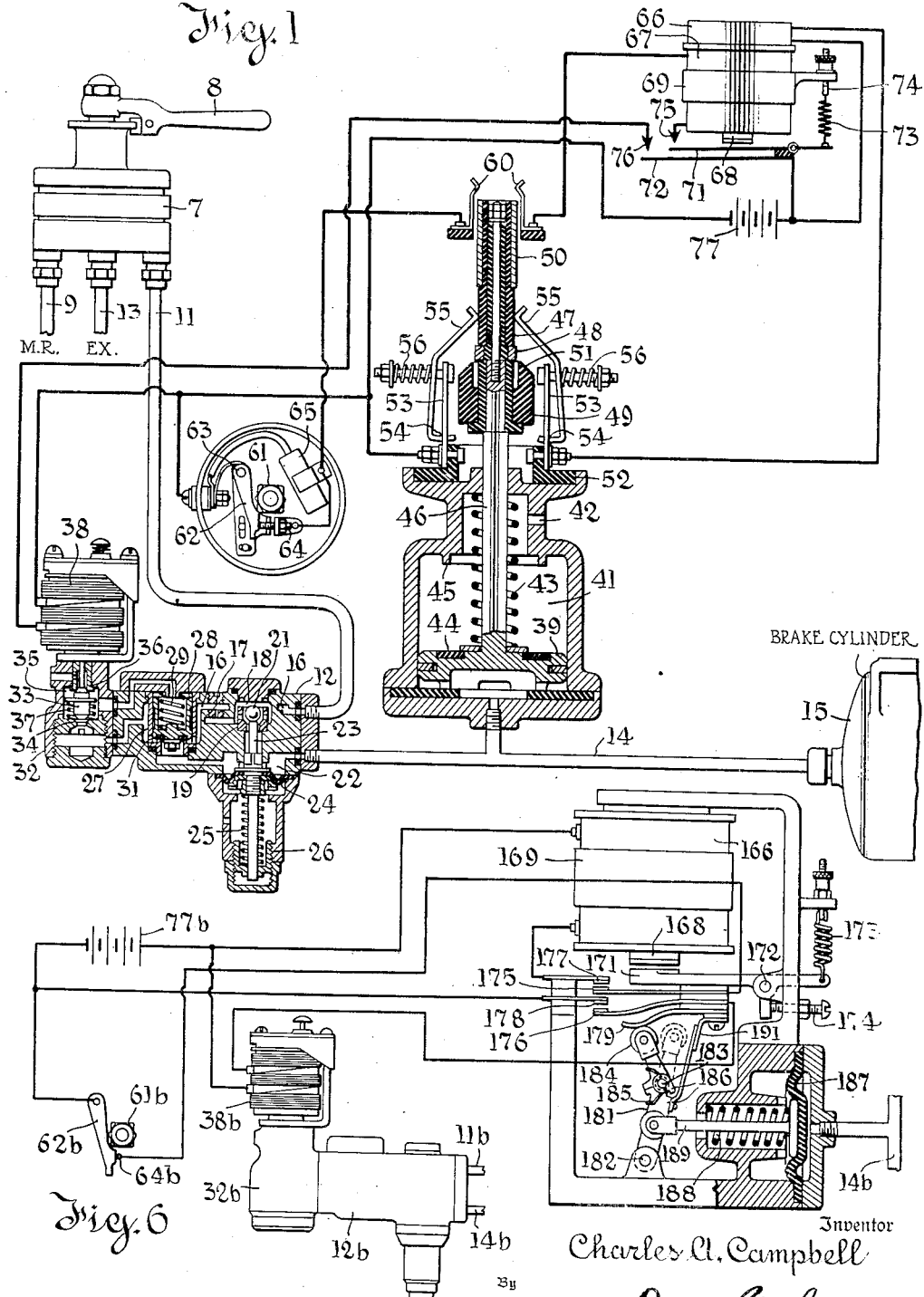
Figure 1 shows the invention diagrammed in its simplest terms and showing use of a relay including a pick-up coil and a sticker coil of conventional type.

Referring first to Figure 1, 7 represents an ordinary straight-air engineer's brake valve which is operated by the handle 8 in the usual manner. Connected to the body of the valve are a pipe 9, leading from the main reservoir or other source of air under pressure, and a straight-air pipe 11, leading to the housing 12 of the pressure limiting valve mechanism. The brake valve exhaust connection is indicated at 13. 14 is the control pipe which leads to any pressure-operated brake-applying mechanism typified by the brake cylinder 15. As explained, this might be the decelerometer and control-chamber unit as in the prior application.

The pipe 11 leads to a port 16 in the limiting valve body 12, and this port leads to a removable choke 17 which controls flow to and from a valve chamber 18. In the chamber 18 are a cup-shaped seat 19 and a captive ball check valve 21. The control pipe 14 communicates directly with a chamber 22 in body 12.

Communication between the chambers 18 and 22 is controlled by the ball check valve 21. Normally, the valve 21 is held off its seat by a stem 23. The stem 23 is connected with the center of a flexible diaphragm 24, the diaphragm being clamped at its periphery between two parts of the body 12. The diaphragm is subject on its upper face to pressure in the chamber 22, and subject on its lower face to atmospheric pressure.

The stem 23 and diaphragm 24 are urged in an upward direction by a coil compression spring 25 which encircles the lower portion of the stem 23 and which is adjustably stressed by a threaded nut 26. It follows that upon rising pressure in the pipe 14, the diaphragm 24 will force the stem 23 downwardly against the resistance offered by the spring 25 and will thus permit the valve 21 to seat. This valve thus tends to close against flow from the pipe 11 to the pipe 14. On releasing flow which occurs in the reverse direction, it opens fully.

The structure above-described serves as a pressure limiting valve which normally would function to limit the pressure which could be developed in the pipe 14 by manipulation of the valve handle 8. The choke 17 serves to limit the rate of flow past the valve 21 so that when the limiting valve is effective to control flow, the choke is effective to control the rate of flow.

A by-pass valve establishes communication past both the choke 17 and the limiting valve 21, from pipe 11 and port 16 directly to chamber 22 and pipe 14. To secure this result, the port 16 leads to a chamber encircling an inserted valve-seat bushing 27 in which works a cup-shaped valve 28 urged in a closing direction by a coil compression spring 29. The valve has a seat gasket 31 which seats on a flange on the bushing 27, such flange encircling the passage which leads to chamber 22. This mechanism will be recognized as what is sometimes called a "protection valve."

The bushing is so ported that the lower end of the valve 28 outside of the seat gasket 31 is subject to pressure in pipe 11. If the space above the valve 28 be open to atmosphere, the valve will open under rising pressure in pipe 11, as soon as the spring 29 is overpowered. Once it starts to open, it opens wide, because of the increased area at its lower end exposed to pressure fluid upon opening.

A magnet valve housing 32 connected to the housing 12 encloses a double beat poppet valve 33. This valve has an inlet seat 34 for the double beat poppet valve which controls flow from the port 16 and consequently from the pipe 11 to a chamber 35 which is in communication with the space above the valve 28. The housing 32 also has an exhaust seat 36 for the double beat valve which controls flow from the chamber 35 to atmosphere. A spring 37 urges the valve 33 against the exhaust seat so that the exhaust connection is closed and the upper side of the valve 28 is subject to pressure in the pipe 11. Under these conditions, the valve will not open under rise of pressure in the pipe 11. If the valve 33 be forced downwardly against the supply seat, the opening of the exhaust port causes the valve 28 to open under rising pressure in the pipe 11.

The valve 33 is arranged to be shifted downwardly to the position just described by the energization of a winding 38, such energization serving to force down an armature within the coil 38 and connected to the valve 33.

To effect the desired result, means are provided to energize the winding 38 only if train speed is above the chosen value, in which event, the valve 28 will open and permit free flow from the engineer's brake valve to the control pipe 14. Below the chosen speed the winding 38 is not energized and the limiting valve 21 under control of the diaphragm 24 limits the pressure developed in the pipe 14, while the choke 17 limits the rate of such development.

To control energization of the winding 38, use is made of a piston 39 working in a cylinder 41. The space within the cylinder beneath piston 39 is connected by a branch with control pipe 14. The space above the piston 39 is vented to atmosphere at 42. A light coil compression spring 43 urges the piston downwardly but this spring is overpowered through its entire range of motion by a pressure rise in pipe 14 of the order of 5-lbs. gauge. Consequently, before an effective braking pressure is developed the piston 39 moves up a full stroke so that gasket 44 with which it is provided seats on the sealing ring 45 to prevent leakage.

The piston 39 has a stem 46 which is guided in the direction of motion of the piston and carries at its upper end an insulating sleeve 47. On the sleeve, there is a metallic contact ring 48. Freely slidable on the lower portion of the sleeve 47 is an insulating collar 49. This is counterbored at its upper end and so arranged that the collar 49 can move upwardly relatively to the sleeve 47 and when in its upward position will completely shroud the contact ring 48. The upper margin of the collar is beveled so that it has a conical configuration indicated at 51. An insulating base carried on the upper end of the cylinder 41 carries two contact struts 53. Pivoted to these contact struts 53 and 54 are two contact fingers 55 each urged against the upper end of sleeve 47 by a corresponding coil compression spring 56 mounted on a stud, as shown.

At the upper end of sleeve 47 is an elongated contactor 50 which connects the two fixed leaf spring contacts 60 when contacts 55 engage ring 48 and in all higher positions of piston 39. The parts 50, 60 form a reset switch to reset the device by breaking the sticker circuit, whenever brakes are released.

When the piston 49 moves upward, the ends of the two contact fingers 55 engage the contactor ring 48 until the collar 49 enters between them, at which time the two contacts engage the cylindrical portion of the collar 49 and are held apart. When the piston 39 starts downward, the collar is frictionally held and the contact ring 48 enters the counterbore in the upper end of the collar 49, thus preventing the contact fingers 55 from engaging the contact ring 48 during the downward motion of the piston.

A cam 61 is rotated by any suitable drive train from a car wheel, so that it rotates at a speed proportional to train speed. This cam actuates a contact arm 62 which is pivoted at 63, forcing the contact arm 62 away from a fixed contact 64 toward which it is spring urged. This device is simply a circuit breaker of substantially the type used in automobile ignition systems. The part 65 is a condenser connected across the gap to reduce sparking.

The relay switch used comprises two coils, a pick-up coil 66 and a sticker coil 67, both wound on a pole piece 68. A copper band 69 encircles the sticker coil to stabilize its action.

In position to be attracted toward the pole piece 68 are a pair of drop contactors 71 and 72 arranged to act in unison and urged to their circuit breaking position by a coil tension spring 73. The stress in this spring is adjustable by means of a screw 74 and this adjustment is used to fix the train speed at which the control device operates. The contactor 71 engages, when lifted, a fixed contact 75 to which one end of the coil 67 is connected. The other end of the coil is connected to one reset contact 60, the other contact 60 being connected to the fixed contact 64 of the circuit breaker. The contactor 72, when lifted, engages a fixed contact 76 which is connected with one terminal of the winding 38.

A battery or other source of current 77 has one terminal connected with the contactors 71 and 72 and with one terminal of the pick-up coil 66. The other terminal of the pick-up coil is connected with one of the contact fingers 55. The other terminal of the battery 77 is connected with the second contact finger 55 and also with the contact arm 62 and with the second terminal of the winding 38. These connections are clearly shown in the drawings.

When the piston 39 moves up and bridges the contact fingers 55 momentarily, it momentarily energizes the pick-up coil 66. At the same time reset contactor 50 bridges contacts 60 and maintains the connection. The effect of energizing the pick-up coil is to lift contactors 71 and 72, thus closing the circuit through the winding 38 and also the impulse circuit through the interruptor switch 62, 64, and the sticker coil 67. If train speed is high enough so that the sticker coil will hold the contacts 71, 72 up against the adjusted tension of the spring 73, the coil 38 is energized continuously. Otherwise, the contacts 71, 72 drop immediately and the winding 38 is only momentarily energized. If it is energized continuously, the valve 28 opens and a by-pass is afforded around the limiting valve 21 so that brake pressure in the pipe 14 can rise to any value permitted by the supply pressure. If the winding 38 is only momentarily energized, the valve 28 remains closed.

Under the latter condition, choke 17 controls the rate of pressure build-up in pipe 14 and valve 21 closes to terminate that build-up when pressure in pipe 14 acting on the diaphragm 24 overpowers spring 25.

When the brakes are released, the reset switch 50 opens the sticker circuit so that the parts reset even if a running release is made at a speed above the control speed.

The relay structure shown in Figure 1 illustrates in very simple form the principle underlying the invention. However, a simple drop relay is likely to be deranged by vibration, and has the objection that the pole piece 68 is energized, first by the pick-up coil 66, and then simultaneously by this coil and by the sticker coil 67. The resulting intense excitation of the pole-piece 68 may at times tend to delay the drop of the contactors at low speed. Accordingly, the use of a novel relay which is indifferent, or substantially indifferent, to vibration and which has separate pole pieces for the two coils is illustrated in Figures 2 to 5, inclusive.

In Figure 2, the parts numbered 7a to 65a, inclusive, and the battery 77a are identical with similarly numbered parts in Figure 1, and require no description.

The relay, which is of the rotary type, will now be described. Mounted on a U-shaped pole piece 81 are two windings 82 connected in series with each other as clearly indicated in Figure 2. These are the analogue of the sticker coil 67 of Figure 1.

Arranged to be attracted to the pole pieces 81 when the windings 82 are energized is an armature 83 which takes the form of a bar fixed upon a vertical spindle 84. This is pivoted at top and bottom as indicated at 85. It is urged counter-clockwise as viewed in plan, that is, away from the pole pieces by a coil torsion spring 86 which is carried by the bridge piece 87 on which the upper pivot 85 is mounted. This bridge piece, of course, is formed of material which does not offer a magnetic path. The armature 83 carries two U-shaped spring contactors, one of which, 88, performs the same function as the part 72 of Figure 1, and the other of which, 89, performs the same function as does the part 71 of Figure 1. To do so, the contactor 88 functions to connect two fixed contacts 91 and 92 and similarly the contactor 89 functions to connect two fixed contacts 93 and 94.

To perform the functions of the pick-up coil 66 of Figure 1, use is made of a winding 95 on a U-shaped pole piece 96. When the winding 95 is energized, an armature 97 fixed on the vertical spindle 84 serves to rotate the spindle against the resistance of the torsion spring.

The circuit connections are clearly diagrammed on Figure 2 and are basically similar to those in Figure 1. When the piston 39a is forced upward, the effect is to energize winding 97. This causes armature 97 to rotate and the contactors 88 and 89 close, thus energizing winding 38a, and the sticker circuit.

The essential difference between Figure 2 and Figure 1 is that the moving elements of the relay switch are balanced, have rotary rather than lineal motion, and consequently, are less subject to the deranging effects of vibration and jar. The use of separate pole pieces for the pick-up and sticker coils avoids cumulative energization and contributes to precise action.

In Figure 6, the pipes 11b, 14b, the parts in the casings 12b and 32b, the coil 38b, the interruptor including parts 61b, 62b and 64b which appear, are all identical with parts in Figures 1 and 2, bearing similar numbers.

A sticker coil 166 has a copper band 169 and pole piece 168. An armature 171 hinged at 172 is attracted to pole piece 168 when winding 166 is excited, and is normally held down by an adjustable spring 173 against adjustable stop 174.

Armature 171 carries two contacts 175 and 176 insulated from each other and from the armature. When the latter is held up, they respectively engage the fixed contacts 177 and 178 each insulated from its support.

The armature 171 also carries a bow spring 179. A lever 181 pivoted at 182 and comprising two halves hinged at 183 carries a roller 184. A very light spring 185 tends to hold the lever straight in a position limited by stops 186 formed on its two halves. The parts are so arranged that when the lever swings counter-clockwise, the lever is held straight and the roller 184 forces bow spring 179 upward, lifting armature 171 until contactors 175 and 176 close. On reverse movement since spring 185 cannot overpower spring 173, the lever folds at its middle so that roller 184 can pass beneath bow spring 179 without lifting the armature.

Lever 181 is actuated by diaphragm 187, subject on its right to pressure in pipe 14b. A light spring 188 opposes the diaphragm and will be overpowered by a pressure of say five-pounds gauge acting thereon. A push-rod 189 transmits the thrust of diaphragm 187 to lever 181 and also acts as a seat for spring 188.

The circuits are shown clearly in diagram. When diaphragm 187 is forced to the left full stroke, lever 181 lifts armature 171 and then releases it. Contactor 175 closes the sticker circuit through the interruptor and contactor 176 closes the circuit through winding 38b. The speed of interruption determines the effectiveness of the sticker circuit and the parts function as in Figure 1.

As diaphragm 187 returns to the right on approach to release the circuits are not reclosed because of the hinging of lever 181. To guard against accidental sticking of armature 171 lever 181 engages finger 191 and forces the armature down. This will be recognized as a modification of the relay shown in the prior application above discussed, the only change being the use of hinge 183 with stops 186 and spring 185.

What is claimed is:

1. The combination of a fluid pressure operated brake-applying means for a vehicle; a brake valve for supplying pressure fluid to and for exhausting it from said means; pressure limiting means for limiting the pressure developed in the brake applying means; electrically controlled means operable to suspend the pressure limiting function of said limiting means; means responsive to vehicle speed for controlling the energization of said electrically controlled means; a pressure operated switch subject to a pressure controlled by said brake valve during its supply and exhaust functions and arranged to put said speed responsive means into controlling relation with said electrically controlled means as an incident to supply; and means for inhibiting the last-named action as an incident to exhaust.

2. The combination of a fluid pressure operated brake-applying means for a vehicle; a brake valve for supplying pressure fluid to and for exhausting it from said means; pressure limiting means for limiting the pressure developed in the brake applying means; electrically controlled means comprising a relay switch having a pick up winding and a sticker winding operable to suspend the pressure limiting function of said limiting means; means responsive to vehicle speed capable of controlling the energization of said sticker winding; and a pressure operated switch subject to a pressure controlled by said brake valve during its supply function and arranged to put said speed responsive means into controlling relation with said sticker winding as an incident to supply.

3. The combination of, fluid pressure operated brake-applying means for a vehicle; a brake valve for supplying and for exhausting pressure fluid to and from said brake applying means; pressure limiting means controlling supply and operable to limit the pressure developed in said brake applying means; electrical means operating according to its state of energization to render said limiting means alternatively effective or ineffective; means responsive to vehicle speed normally disconnected from said electrical means and effective when connected to control energization and de-energization of said electrical means, and also to control its connection therewith, according to whether speed is above or below a chosen value; and a switch temporarily closed as an incident to said supply of pressure fluid, to place said speed responsive means in control.

4. The combination of, fluid pressure operated brake applying means for a vehicle; a brake valve for supplying and for exhausting pressure fluid to and from said brake applying means; pressure limiting means controlling supply and operable to limit the pressure developed in said brake applying means; electrical means operating according to its state of energization to render said limiting means alternatively effective or ineffective; means responsive to vehicle speed normally disconnected from said electrical means and effective when connected to control energization and de-energization of said electrical means, and also to control its connection therewith according to whether speed is above or below a chosen value; a switch temporarily closed as an incident to said supply of pressure fluid, to place said speed responsive means in control; and means for thereafter suspending the closing function of said switch until exhaust is completed.

5. The combination of fluid pressure operated brake applying means for a vehicle; a brake valve for supplying and for exhausting pressure fluid to and from said brake applying means; pressure limiting means controlling supply and operable to limit the pressure developed in said brake applying means; electrical controlling means adapted to operate according to its state of energization to render said limiting means alternately effective and ineffective; electric relay means responsive to vehicle speed comprising a sticker circuit, effective above a chosen speed, a separate energizing circuit for said controlling means effective above said chosen speed, and a separate pick-up circuit for initiating response of the relay; two normally open switches, the first controlling the pick-up circuit and the second the sticker circuit; pressure operated means responsive to the pressure of initial supply to close both switches and then open the first.

6. The combination of, fluid pressure operated brake-applying means for a vehicle; a brake valve for supplying and for exhausting pressure fluid to and from said brake applying means; pressure limiting means controlling supply and operable to limit the pressure developed in said brake applying means; electrical controlling means adapted to operate according to its state of energization to render said limiting means alternately effective and ineffective; electric relay means responsive to vehicle speed comprising a sticker circuit, effective above a chosen speed, a separate energizing circuit for said controlling means effective above said chosen speed, and a separate pick-up circuit for initiating response of the relay; two normally open switches, the first controlling the pick-up circuit and the second the sticker circuit; pressure operated means responsive to the pressure of initial supply to close both switches and then open the first; and means for precluding the closure of the first switch during the opening movement of the second.

7. The combination of a fluid pressure operated device to be controlled according to vehicle speed; electric means for exercising control according to whether it is energized or deenergized; a normally open relay switch including a pick-up coil and a sticker coil; a first circuit including the pick-up coil and a normally open pick-up switch; a second circuit including the sticker coil, a circuit breaker driven at a rate proportionate to vehicle speed and a normally open reset switch; a third circuit controlled by the relay switch and including said electric means; means for supplying current to said circuits; and motor means operated by the supply and exhaust of pressure fluid to and from said device to close the pick-up and reset switches and then open the pick-up switch during supply, and open the reset switch as an incident to exhaust.

8. The combination of fluid pressure operated brake-applying means for a vehicle, a brake valve for supplying and for exhausting pressure fluid to and from said brake-applying means; pressure limiting means controlling supply and operable to limit the pressure developed in said brake applying means; electrical controlling means adapted to operate according to its state of energization to render said limiting means alternately effective and ineffective; an electric relay responsive to vehicle speed and comprising a sticker circuit effective above a chosen speed and a separate energizing circuit for said controlling means arranged to be closed when said sticker circuit is effective; electric motor means distinct from the relay and including a distinct pick-up circuit and an armature shifted thereby to close the relay; two normally open switches, the first controlling the pick-up circuit and the second the sticker circuit; and pressure operated means responsive to the pressure of initial supply to close both switches and then open the first.

9. The combination of fluid pressure operated brake-applying means for a vehicle, a brake valve for supplying and for exhausting pressure fluid to and from said brake-applying means; pressure limiting means controlling supply and operable to limit the pressure developed in said brake applying means; electrical controlling means adapted to operate according to its state of energization to render said limiting means alternately effective and ineffective; an electric relay responsive to vehicle speed and comprising a sticker circuit effective above a chosen speed and a separate energizing circuit for said controlling means arranged to be closed when said sticker circuit is effective; electric motor means distinct from the relay and including a distinct pick-up circuit and an armature shifted thereby to close the relay; two normally open switches, the first controlling the pick-up circuit and the second the sticker circuit; pressure operated means responsive to the pressure of initial supply to close both switches and then open the first; and means for precluding the closure of the first switch during the opening movement of the second.

10. The combination of fluid pressure operated brake-applying means for a vehicle, a brake valve for supplying and for exhausting pressure fluid to and from said brake-applying means; pressure limiting means controlling supply to and operable to limit the pressure developed in said brake applying means; electrical controlling means adapted to operate according to its state of energization to render said limiting means alternately effective and ineffective; an electric relay of the rotary type responsive to vehicle speed and comprising a sticker winding and armature effective above a chosen speed to hold the relay closed; a separate energizing circuit for said controlling means arranged to be closed when the sticker circuit is closed; a motor for closing the relay comprising a separate winding and circuit and an armature connected to the relay to move the same to closing position when the pick-up circuit is energized; two normally open switches, the first controlling the pick-up circuit and the second a sticker circuit; and pressure operated means responsive to the pressure of initial supply to close both switches and then to open the first.

11. The combination of fluid pressure operated brake applying means for a vehicle, a brake valve for supplying and for exhausting pressure fluid to and from said brake-applying means; pressure limiting means controlling supply to and operable to limit the pressure developed in said brake applying means; electrical controlling means adapted to operate according to its state of energization to render said limiting means alternately effective and ineffective; an electric relay of the rotary type responsive to vehicle speed and comprising a sticker winding and armature effective above a chosen speed to hold the relay closed; a separate energizing circuit for said controlling means arranged to be closed when the sticker circuit is closed; a motor for closing the relay comprising a separate winding and circuit and an armature connected to the relay to move the same to closing position when the pick-up circuit is energized; two normally open switches, the first controlling the pick-up circuit and the second a sticker circuit and pressure operated means responsive to the pressure of initial supply to close both switches and then to open the first; and means for precluding the closure of the first switch during the opening movement of the second.

CHARLES A. CAMPBELL.